United States Patent Office 3,187,014
Patented June 1, 1965

3,187,014
PREPARATION OF COMPLEX METAL ALKYL-BORON COMPOUNDS
Richard C. Pinkerton, Raleigh, N.C., assignor to Ethyl Corporation, New York, N.Y., a corporation of Virginia
No Drawing. Filed Feb. 9, 1962, Ser. No. 172,108
9 Claims. (Cl. 260—346.1)

The present invention is concerned with a novel process for the preparation of complex metal alkylboron compounds and the novel products thereby produced. This application is a continuation-in-part of my prior copending application Ser. No. 783,075, filed December 29, 1958, now abandoned.

It has been known to prepare certain complex metal organoboron compounds by the reaction of certain organoalkali metal compounds with organoboranes. Specifically, phenyllithium has been reacted with triphenylborane to produce lithium tetraphenylboron. The procedure has been of limited use primarily because of the difficulty in preparing the organolithium and comparable organoalkali metal compounds. It is also reported that sodium can be reacted with triphenylborane to produce sodium triphenylborane. This operation has been extended to other aromatic borane compounds. The literature reports that this procedure is not applicable to the preparation of analogous alkylborane compounds. For example, heretofore no one has been able to react sodium with triethylborane to produce the analogous sodium triethylboron compound or for that matter sodium tetraethylboron. This is somewhat anomalous in view of the above procedure for forming sodium triphenylboron and the further known procedure of reacting sodium with aluminum triethyl to produce sodium aluminum tetraethyl and aluminum metal. It is desirable to the industry to obtain complex metal alkylboron compounds because of their many and varied uses and it is especially desirable to obtain such compounds employing a metal such as sodium or potassium rather than using the difficultly prepared alkyl derivatives of these metals.

An object of this invention is to provide a novel process for the production of such compounds wherein metallic sodium, potassium, rubidium or cesium is employed. A further object is to provide novel compositions of matter especially the novel products produced according to the process of the present invention. These and other objects will be evident as the discussion proceeds.

It has now been found that complex sodium, potassium, rubidium and cesium alkylboron compounds can be readily prepared without resorting to the use of an alkyl derivative of these particular alkali metals. The discovery has been made that metallic sodium, potassium, rubidium and cesium can be reacted, either individually or in various mixtures or alloys, with an alkylborane in the presence of a polyether or tetrahydrofuran to produce a complex mixture of considerable utility. It is preferable to employ sodium as the metal for reaction with at least 2 moles of the trialkylborane per mole of sodium in the presence of at least 1 mole of the ether with the reaction temperature being between at least the melting point of the metal and 160° C. The polyethers of the glycol ethers, especially the dimethyl and diethyl ethers of diethylene glycol are particularly well suited in the process. Thus, an especially preferred embodiment of this invention comprises the reaction of sodium metal with at least about 2 moles of triethylborane per mole of sodium in the presence of at least 2 moles of the dimethyl ether of diethylene glycol at a temperature between above the melting point of sodium and 160° C. By the above briefly described procedure, novel products are obtained which are of considerable utility over and above presently known complex metal organoboron compounds even though the present products are as yet undefined. A particularly preferred composition possessing unique properties is that obtained when reacting sodium with triethylborane in the presence of the dimethyl ether of diethylene glycol as described above.

Another aspect of this invention is the discovery that the alkali metals of atomic numbers 19 through 55, i.e., potassium, rubidium and cesium, will form the novel and useful products referred to above in the absence of any reaction solvent. In this instance the potassium, rubidium and/or cesium is directly reacted with an alkylborane preferably at elevated temperature ranging from about 50° C. up to the reflux temperature of the system. Most preferably the reaction temperature is within the range of from about 95-100° C. up to the decomposition temperature of the reactants and products which of course will vary somewhat depending upon the identity of the alkylborane and particular alkali metal being reacted together. If desired, these particular reactions may be conducted in a suitable inert solvent such as a hydrocarbon or simple ether which is liquid under the reaction conditions, benzene, toluene, heptane, decane, cyclohexane, dibutyl ether, butyl phenyl ether, dibenzyl ether, and the like serving as illustrative examples. It is generally preferable, however, to run this reaction in a polyether or tetrahydrofuran when employing a solvent because the resulting system is conveniently used for further reactions in accordance with the ensuing description relative to the utilities of the novel products of this invention.

The present invention thus provides a novel process for the preparation of complex metal alkylboron compounds having advantages over the prior art techniques particularly in that it is based upon the metal and an alkylborane. Thus the organo alkali metal compounds employed by the prior art are not required. Additionally for the first time alkylboranes have been successfully reacted with sodium, with potassium and with cesium which had not heretofore been accomplished. Further, novel compositions which are completely homogeneous and of greater utility than simple metal organoboron compounds are now provided for the first time. These and other advantages of the present invention will be evident as the discussion proceeds.

The metallic reactant employed is sodium, potassium, rubidium and/or cesium. These metals can be employed in their commercially available forms, for example massive sodium is quite applicable. If desired, finely divided metal, such as the well known sodium dispersions, is also applicable. Mixtures of these alkali metals can be used to provide mixed alkali metal products of this invention.

The alkylborane which is employed is a trialkylborane, that is all the valences of boron are satisfied by alkyl radicals. Included among such alkylborane compounds are, for example, trimethylborane, triethylborane, trihexylborane, tridecylborane, trioctadecylborane and the like including such boranes complexed with, for example, ethers or amines. In general, such compounds will have up to and including 18 carbon atoms wherein each alkyl radical is a hydrocarbon radical. Any substituents on the hydrocarbon groups should, of course, be essentially inert in the reaction and should be such that would not hinder the desired result. Mixed alkylboranes can be employed as for example methyl diethylborane but it is preferable to employ only compounds wherein all the alkyl groups are identical. The trihydrocarbon alkylboranes wherein each alkyl hydrocarbon group contains up to about 8 carbon atoms are preferred with triethylborane being particularly well suited.

It has been found that in order for the sodium to react with a trialkylborane, a polyether or tetrahydrofuran must be employed. On the other hand potassium, ribidium and cesium do not require the use of such solvent. One criterion for choice of such ethers is that they be not readily subject to cleavage by the metal under the conditions employed. Likewise, although commercial forms of such ethers are suitable, it is preferred that they be essentially anhydrous and alcohol free in order to avoid waste of the metal. It has been found that simple ethers, as distinguished from the aforementioned ethers, are not applicable in the present process. Examples of the polyethers which are employed are those having the configuration R—O—$(CH_2)_n$—O—R wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like. Of such ethers the dialkyl ethers of ethylene and diethylene glycol wherein the alkyl groups contain up to about 6 carbon atoms are particularly preferred. In this connection the dimethyl ether of diethylene glycol and ethylene glycol produce best results.

The proportions of the materials employed in conducting the process of this invention are important to a certain degree for obtaining the desired results. In general at least 2 moles of the alkylborane per mole of the metal and, when using the preferred polyethers or tetrahydrofuran, at least 1 mole of such ether per mole of alkylborane are employed. Usually not more than 2½ moles of the alkylborane and not more than about 10 moles of the ether are employed per mole of the metal. When an ether of a polyhydric alcohol is employed, rather than tetrahydrofuran, it is preferable to use at least 2 moles and not more than 10 moles of such an ether. It is also preferable to employ at least a sufficient amount of the ether to result in a completely homogeneous liquid product. A particularly preferred embodiment of this invention is that wherein substantially 2 moles of the alkyl borane and at least 2 moles of the ether but an amount sufficient to result in a homogeneous liquid product per mole of the metal, particularly sodium, is employed. The foregoing proportions are also applicable when reacting potassium, rubidium and/or cesium with an alkylborane in a hydrocarbon or simple ether solvent.

The product which is produced by the process of this invention is not readily susceptible to description. Attempts have been made to establish the chemical configuration of the resultant mixture but such have been inconclusive. Although it has been definitely established by infra-red analyses that the product from the reaction of cesium with triethylborane without a solvent has a B-H bridging group. It is clear that all ingredients employed remain in the mixture under the conditions of operation and when utilizing a polyether or tetrahydrofuran solvent, a homogeneous solution results. No solid constituents are prepared when the requisite amounts of polyether or tetrahydrofuran are employed and no by-product boron has resulted. If some solid is contained in the mixture further quantities of such ether can be added to dissolve this material. When the product has been subjected to successive extraction and crystallization an etherate complex of an alkali metal tetraalkylboron is precipitated leaving a yellowish solution. The configuration of the material contained in this residual solution likewise has not been identified but is believed to be some polymeric form of alkylboron. Clearly it is not a trialkylboron since it does not exhibit ready flammability and decomposition when exposed to the atmosphere. Thus the most that can be said at the present time in describing the product obtained by the preferred process of this invention involving use of a polyether or tetrahydrofuran solvent is that it contains the sodium, potassium, rubidium or cesium, the boron, the alkyl groups and the ether groups in some complex formation as yet indefinable and that when separation operations are made some type of rearrangement may take place to result in an alkali metal tetraalkylboron complexed with the ether employed and leave a solution of boron alkyl in perhaps polymeric form. In any event the product is susceptible to many varied and unique uses as brought forth in more detail hereinafter.

The products obtained from the solvent-free embodiments of this invention also defy characterization although they appear to be similar to those discussed above except, of course, no ether complexation or the like is involved. The products made in the absence of a solvent exist as solids at room temperature, however. Also, they contain a B-H bridging group showing some sort of unusual rearrangment reaction.

The process of this invention is readily adaptable to conventional processing techniques. A typical sequence of operations is to add the trialkylborane in solution in polyether or tetrahydrofuran to a reactor equipped with internal agitation and external heating means. Then the sodium, potassium, rubidium or cesium metal is added to the reaction mixture and the resulting mixture heated, preferably to the melting point of the metal, with agitation. These conditions are maintained for about one hour. The resulting mixture is then ready for further use or can be cooled to room temperature for storage under an inert atmosphere. Variants for use in practicing other embodiments of this invention will now be apparent to those skilled in the art.

The process of this invention and the novel products thereby produced will be more completely understood by a consideration of the following examples. In these examples, unless otherwise specified, all parts are by weight.

*Example I*

To a reactor equipped with internal agitation, and external heating means was added 35 parts of triethylborane and 120 parts of the dimethyl ether of diethylene glycol were added thereto. Then 8.15 parts of sodium were added to the mixture and the mixture was permitted to react at room temperature. The mixture was permitted to remain under these conditions for 3 days. Then sodium which did not go into solution was removed therefrom by filtration, 3.42 parts of sodium were thereby recovered. Thus, it was demonstrated that substantially 2 moles of the triethylborane per mole of sodium should be employed and that a simple adduct such as $NaBEt_3$ is not obtained.

When a sample of material prepared according to the above procedure was subjected to hydrolysis at room temperature by adding water dropwise, 13.8 milliliters of hydrogen were evolved whereas the theoretical or sodium equivalent would have been 27.22 milliliters. Thus only ½ of the theory was evolved further demonstrating that a simple adduct is not formed by the reaction. Likewise when a dimethyl ether of diethylene glycol-triethylborane solution was subjected to infrared analysis before and after sodium treatment according to the above procedure the untreated solution showed distinct bands at 7.70 and 12.98$\mu$. The sodium reacted solution did not show these bands but showed bands at 5.11, 5.50 and from 14.5 to 15$\mu$ illustrating that an actual reaction of some type takes place.

*Example II*

Employing the reactor of Example I, 52 parts of triethylborane dissolved in 240 parts of essentially alcohol free and anhydrous dimethyl ether of diethylene glycol were added thereto. Then 6 parts of sodium, resulting in a 2:1 mole ratio of triethylborane to sodium, were added to the mixture and the mixture heated to 125° C. and maintained at this temperature for 4 hours. During this period all of the sodium reacted to result in a homogeneous tan solution as product.

*Example III*

Into the reactor of Example I and employing the procedure of Example II, 35 parts of triethylborane, 110 parts of tetrahydrofuran and then 8.15 parts of sodium were added. Agitation was commenced and the mixture agitated overnight with the temperature at 32° C. Agitation was continued and the mixture permitted to react for an additional 3 days. At the end of this period, the solution obtained was a yellowish color.

*Example IV*

Employing the reactor of Example I, a solution of 100 parts of triethylborane in 350 parts of the dimethyl ether of diethylene glycol was added to the reactor. Then 20.3 parts potassium metal was added to this solution. In this instance, immediately upon addition of the potassium it was found that rapid dissolving took place and the solution became warm enough to melt the remaining potassium. Thus, with potassium substantially ½ mole of potassium per mole of the triethylborane was employed. The mixture was permitted to stand overnight at room temperature with agitation. When subjecting a portion of the resulting solution to evaporation at room temperature under vacuum, crystals formed which were separated from the liquid by filtration and washed with cold dimethyl ether of diethylene glycol. In order to determine whether potassium tetraethylboron di-dimethyl ether of diethylene glycol etherate was the product crystallized, a sample of the crystallized product was analyzed and it was found that it contained 2.13 percent boron, 7.87 percent potassium, 51.81 percent carbon, 10.19 percent hydrogen whereas potassium tetraethylboron di-dimethyl ether of diethylene glycol etherate contains 2.5 percent boron, 9.0 percent potassium, 55.3 percent carbon and 11.12 percent hydrogen. Thus, it is concluded that the indicated potassium tetraethylboron compound was the product separated.

*Example V*

The procedure of Example II was employed with exception that 2.78 parts of potassium were reacted with 14 parts of triethylborane in the presence of 40 parts of the diethyl ether of ethylene glycol at 65° C. for 4 hours.

*Example VI*

Employing the procedure of Example II, 1.14 parts of potassium were reacted with 15.6 parts of trihexylborane in the presence of 40 parts of the dimethyl ether of diethylene glycol at 65° C. for 4 hours. A homogeneous yellow solution was obtained.

When sodium, rubidium and cesium are individually substituted in Examples V and VI, equally satisfactory results are obtained.

*Example VII*

Again employing the procedure of Example II, 11.5 parts of sodium are added to 34.4 parts of trioctylborane dissolved in 150 parts of the dimethyl ether of triethylene glycol and reacted at 160° C. for 3 hours.

The following two examples illustrate the solvent-free embodiments of this invention.

*Example VIII*

Charged to a reaction vessel equipped with stirring and heating means were 10 parts of potassium metal and 70 parts of triethylborane. The mixture was then refluxed while rapidly stirring the mixture for the reaction period of 6 hours. The reaction proceeded smoothly to give a brown viscous liquid at the temperature of the refluxing triethylborane. On cooling to room temperature a brown solid product was obtained which had the appearance of a polymer. This material contained a small amount of unreacted potassium. Some of the complex was dissolved in diglyme, hydrolyzed and subjected to gas chromatography. Hydrogen was the main component with a trace of ethane being present. Chemical analysis of the diglyme solution of the product indicated it to have a boron to potassium atom ratio of approximately 2.

*Example IX*

Cesium metal was reacted with refluxing triethylboron for a period of 8 hours using the general procedure described in Example VIII. A solid precipitated from the reaction mixture which, upon chemical annalysis, was found to contain a boron/cesium ratio of 1.86. When dissolved in diglyme this product showed the ability to add on a molecule of triethylboron. Infrared analysis of the product gave a definite indication of the presence of a boron/hydrogen bridging group. When subjected to hydrolysis with water, hydrogen was liberated from the product. When the hydrolysis was conducted using aqueous mineral acid, hydrogen gas and some ethane were liberated.

As pointed out above, metallic sodium will not react with the trialkylboron compounds in the absence of the polyether or tretahydrofuran solvents.

Equally satisfactory results are obtained when other alkyl boranes and others are substituted in the above examples including, for example, tributylborane, trioctadecylborane, tridecylborane, and the diphenyl ether, dipropyl ether, dibutyl ether, dihexyl ether, and the like ethers of diethylene, ethylene, triethylene, and tetraethylene glycol.

The temperature at which the reaction is conducted can be varied over a wide range as for example between about 0 to 200° C. The main criteria of temperature are to stay below that at which substantial ether cleavage or decomposition of the product would result when using a polyether or tetrahydrofuran solvent. When using potassium, rubidium and/or cesium and no solvent, it is important to avoid temperatures which would be so high as to decompose the product. Best results are, however, obtained when employing a temperature of at least the melting point of the metal up to and including about 160° C. Faster reaction rates are obtained within this range and temperatures above about 160° C. are least desirable since some side reaction appears to take place causing the formation of a sticky or gummy, apparently polymeric type material, which results in a product which is difficult to handle.

The reaction is generally conducted in the presence of an inert atmosphere because of the high reactivity of the sodium, potassium, rubidium or cesium prior to its reaction with the trialkylborane. For this purpose the usual inert atmospheres can be employed including neon, nitrogen, krypton, argon and the like. Pressure is not critical in the operation and can be varied. Ordinarily atmospheric pressure is employed but if temperature conditions are such to volatilize any of the reactants sufficient pressure can be employed to maintain them in the liquid state.

The reaction which takes place commences essentially instantaneous upon mixing the reagents. The reaction period is dependent somewhat on the temperature employed, i.e., higher temperatures require less time than low temperatures. Generally not more than about 72 hours are required for completion of the reaction regardless of temperature employed. When conducting the reaction above the melting point of the metal, which is preferred, it has been found that satisfactory reaction is achieved from between 1 to 5 hours.

The product obtained according to the process of this invention is of considerable utility. A particularly advantageous use is the reaction thereof with hydrogen and subsequent olefination after adding additional sodium, potassium, rubidium or cesium to result in a simple higher alkylated alkali metal tetraalkylboron compound. That is, the product produced as described above can be reacted with hydrogen and then reacted with an olefin. Alternatively, the product can be reacted with an olefin and then reacted with hydrogen and these operations again repeated. It is preferred to perform the latter sequence of operations, namely olefinating and then hydrogenating after adding more of the alkali metal to the product. Regardless of which sequence of reactions is employed one first adds sodium, potassium, rubidium or cesium, as the case may be, to the product as produced above employing at least one mole thereof per mole of metal used and in forming the novel product of this invention. The olefination is conducted at a pressure above atmospheric and at a temperature between 0 to 200° C. until no further olefin uptake is exhibited or the uptake of olefin per unit time is negligible. The same conditions are employed during the reaction with hydrogen. It is preferred to employ a temperature between 150 to 225° C. and a pressure between 200 to 1000 p.s.i. during the hydrogenation and olefination reactions. Although the hydrogenation and olefination can be accomplished simultaneously such is less desirable than a sequential operation as described above since some hydrogenation of the olefin may result. It is likewise preferable to employ at least 2 cycles of hydrogenation and olefination operations.

In this particular utility one can employ typical olefins. Included among such materials are ethylene, propylene, butylene, hexene-1, hexene-2, 1-octene, butadiene, cyclohexene, octadecylene-1, styrene and the like olefins having up to about 18 carbon atoms. The terminal unsaturated olefins, that is those wherein the double bond is in the α-position, of straight chain hydrocarbon olefins having up to about 8 carbon atoms are particularly preferred because of their greater availability and reactivity. Likewise olefins which are analogous to the alkyl groups of the trialkylborane employed in producing the novel products of this invention are preferred. Ethylene is an especially useful olefin.

The following example will demonstrate this particular utility of the product produced according to the process of this invention.

*Example X*

Employing the reactor of Example I, 52 parts of triethylborane dissolved in 240 parts of unpurified tetrahydrofuran were reacted with 12 parts of sodium at 160° C. and 4 hours. Thus, an excess of sodium was employed to leave about 6 parts unreacted and in admixture with the product. This mixture was left in the reactor and the reactor was pressurized with ethylene to 600 p.s.i. with the temperature maintained at 160° C. These conditions were maintained until it was evident that no further ethylene was taken up by the product. When this point was reached the ethylene was replaced by hydrogen and the same conditions maintained until no further hydrogen was taken up. The cycle of ethylene and hydrogen pressurization was then repeated until, in each instance, no further ethylene and hydrogen was taken up. A homogeneous liquid product was obtained. The product was subjected to evaporation at 120° C. and 1 mm. Hg to remove all ether except that which is complexed. The solid amount to 81.2 parts which is 73 percent of theoretical based on all of the sodium employed forming the tetrahydrofuran etherate of sodium tetraethylboron. When the resultant crystals were analyzed, analysis showed 11.77 percent sodium, and 4.12 milliequivalents of gas evolved per gram of sample upon hydrolysis with dilute HCl solution whereas the tetrahydrofuran etherate of sodium tetraethylboron contains 10.07 percent sodium, with 4.50 milliequivalents of gas evolved theoretically possible. The high sodium content is attributed to impurities in the tetrahydrofuran employed.

Similar results are obtained when one substitutes the untreated products obtained in Examples I–VII and other polyethers and alkylboranes along with other olefins in the above example.

In this utility one obtains alkali metal tetraalkylboron compound complexed with the ether employed. A typical example is sodium tetraethylboron complexed with the dimethyl ether of diethylene glycol. Such materials are of particular use as alkylating agents, for example, they are readily reacted with a lead salt such as lead chloride or lead acetate to produce tetraalkyllead compounds which are useful as antiknock agents. These products are also of greater utility then uncomplexed metal alkylboron compounds since they are of greater stability and easier to handle. They likewise exhibit greater solubility in hydrocarbons than the uncomplexed compounds. For example, sodium tetraethylboron begins to sublime when subjected to a temperature of 160° C. and 1 millimeter mercury pressure. In contrast, the dimethyl ether of diethylene glycol etherate of sodium tetraethylboron is unaffected when subjected to these conditions.

The product of this invention is also useful by directly subjecting it to olefination, without adding additional sodium or potassium thereto, to result in a product which in turn is likewise useful as an alkylating agent. The following example will demonstrate such a use.

*Example XI*

Employing the procedure of Example I, 52 parts of triethylborane dissolved in 200 parts of tetrahydrofuran were reacted with 10.52 parts of potassium at 65° C. for 2 hours. All of the potassium went into solution and thus ½ mole of potassium per mole of triethylborane reacted. The reactor was then heated to 160° C. and then pressurized to 600 p.s.i. with ethylene. The mixture was agitated for 3½ hours at which time the pressure had dropped to 520 p.s.i. indicating take-up of ethylene to the extent of ¼ mole per mole of triethylborane originally used. Thus, the mixture reacted with ethylene. While it is not intended to be bound thereby, it is postulated that a reaction as follows may have taken place:

$$2BEt_2 + C_2H_4 \rightarrow (Et_2BCH_2\cdot)_2$$

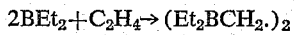

indicating the presence of $BEt_2$ in the product obtained before ethylation.

Similar results are obtained when the untreated products of Examples I through IX above are reacted with other olefins described hereinbefore.

The products are also useful for reacting with an alkyl halide to produce a trialkylborane. For example, when the product of Example II is reacted with methyl chloride, methyldiethylborane is obtained. The products are also useful as a source of hydrogen. For example, when the product of Example III is subjected to hydrolysis, hydrogen is generated. Still further the products of this invention are excellent as reducing materials, e.g. reduction of alcohols, and ketones. These and other uses will be evident to those skilled in the art.

Having thus described the process of this invention and the novel products thereby obtained, it is not intended that it be limited except as set forth in the following claims.

I claim:

1. The process for producing an organoboron compound which comprises reacting an alkali metal of atomic number of 11 through 55 with a trialkylborane in the presence of an ether which is liquid under the reaction conditions and is selected from the group consisting of tetrahydrofuran and dialkyl ethers of ethylene glycol, diethylene glycol, triethylene glycol and tetraethylene glycol, said trialkylborane being employed in amount of at least 2 moles thereof per mole of said metal.

2. The process for producing an organoboron compound which comprises reacting a metal selected from the group consisting of sodium and potassium with a trialkylborane in the presence of an ether which is liquid under the reaction conditions and selected from the group consisting of tetrahydrofuran and a dialkyl ether of ethylene glycol, diethylene glycol, triethylene glycol and tetraethylene glycol, said trialkylborane being employed in amount of at least 2 moles thereof per mole of said metal, and then subjecting the resulting product to sequential olefination at 0 to 200° C. and a pressure above atmospheric, and hydrogenation at 0 to 200° C. and a pressure above atmospheric.

3. The process for producing an organoboron compound which comprises reacting triethylborane with sodium in the presence of the dimethyl ether of diethylene glycol, wherein essentially 2 moles of said ether and triethylborane, respectively, are employed per mole of said sodium, at a temperature between about the melting point of sodium and 160° C.

4. The process for producing the tetrahydrofuran etherate of sodium tetraolkylboron which comprises reacting triethylborane with sodium in the presence of tetrahydrofuran, wherein essentially 2 moles of said ether and triethylborane, respectively, per mole of said sodium are employed, at a temperature between about the melting point of sodium and 160° C., and then subjecting the product so produced to sequential ethylation with ethylene and hydrogenation with hydrogen at 150 to 225° C. and 200 to 1000 p.s.i., respectively.

5. The process of producing an organoboron compound which comprises reacting together at a temperature of from about 50° C. up to about the reflux temperature of the system a mixture consisting essentially of an alkali metal of atomic No. 19 through 55 and a trialkyl borane in which each of the alkyl groups contain from 1 to about 18 carbon atoms, said trialkyl borane being employed in an amount of at least 2 moles thereof per mole of said metal.

6. The process of claim 5 wherein said metal is potassium and said trialkylborane is triethylborane, the reaction being conducted at about the reflux temperature of the mixture.

7. The process of claim 5 wherein said metal is cesium and said trialkylborane is triethylborane, the reaction being conducted at about the reflux temperature of the mixture.

8. The product produced when reacting a metal selected from the group consisting of sodium and potassium with a trialkyl borane in which each alkyl group contains from 1 to about 18 carbon atoms in the presence of an ether which is liquid under the reaction conditions and is selected from the group consisting of tetrahydrofuran and dialkyl ethers of ethylene glycol, diethylene glycol, triethylene glycol, and tetraethylene glycol, said reaction being conducted at a temperature between the melting point of the metal and 160° C., said trialkyl borane being employed in an amount of at least 2 moles thereof per mole of said metal.

9. The product produced when reacting triethylborane with sodium in the presence of the dimethyl ether of diethylene glycol, wherein essentially 2 moles of said ether and triethylborane, respectively, are employed per mole of said sodium, at a temperature between about the melting point of sodium and 160° C.

References Cited by the Examiner
UNITED STATES PATENTS 3,055,945   9/62   Honeycutt _____ 260—346

IRVING MARCUS, *Primary Examiner.*

NICHOLAS S. RIZZO, *Examiner.*